(12) United States Patent
Kibby et al.

(10) Patent No.: US 7,943,673 B2
(45) Date of Patent: May 17, 2011

(54) PROCESS FOR CONVERSION OF SYNTHESIS GAS TO HYDROCARBONS USING A ZEOLITE-METHANOL CATALYST SYSTEM

(75) Inventors: Charles L. Kibby, Benicia, CA (US); Allen W. Burton, Jr., Richmond, CA (US); Alfred Haas, Baden-Württemberg (DE); Simon Holz, Baden-Württemberg (DE)

(73) Assignee: Chevron U.S.A. Inc., San Ramon, CA (US)

( * ) Notice: Subject to any disclaimer, the term of this patent is extended or adjusted under 35 U.S.C. 154(b) by 330 days.

(21) Appl. No.: 12/316,209

(22) Filed: Dec. 10, 2008

(65) Prior Publication Data

US 2010/0144907 A1 Jun. 10, 2010

(51) Int. Cl.
*C07C 27/00* (2006.01)
(52) U.S. Cl. .................................. 518/700; 518/714
(58) Field of Classification Search ............ 518/700, 518/714
See application file for complete search history.

(56) References Cited

U.S. PATENT DOCUMENTS

| | | | |
|---|---|---|---|
| 4,011,275 | A | 3/1977 | Zahner |
| 4,180,516 | A | 12/1979 | Chang et al. |
| 4,331,774 | A | 5/1982 | Boersma et al. |
| 4,968,650 | A | 11/1990 | Chu et al. |

FOREIGN PATENT DOCUMENTS

EP 173381 4/1989

OTHER PUBLICATIONS

D. Freeman et al., "Methanol to Hydrocarbons: Enhanced Aromatic Formation Using Composite Group 13 Oxide/H-ZSM-5 Catalysts,"Catalysis Letters, 82, Nos. 3-4, Oct. 2002, pp. 217-225.
F. Simard et al., "Pseudoadiabatic Catalytic Reactor Operation for the Conversion of Synthesis Gas into Hydrocarbons (Gasoline Range)," Ind. Eng. Chem. Res., 30, 1991, pp. 1445-1455.
D. Cryder et al., "Catalysts for the Formation of Alcohols from Carbon Monoxide and Hydrogen," Industrial and Engineering Chemistry, Sep. 1929, pp. 867-871.
M. Bradford, et al., "Preparation, Characterization and Application of $Cr_2O_3/ZnO$ Catalysts for Methanol Synthesis," Fuel Processing Technology, 83, 2003, pp. 11-25.

*Primary Examiner* — Jafar Parsa
(74) *Attorney, Agent, or Firm* — Karen R. DiDomenicis; Stephen Zavell; Alan Klaassen

(57) ABSTRACT

A process is described for converting synthesis gas containing carbon monoxide and hydrogen to hydrocarbons via methanol as an intermediate, by contacting the synthesis gas with a catalyst system containing a mixture of gallium silicate zeolite catalyst and a methanol catalyst. The process results in reduced amounts of undesirable low carbon number hydrocarbons, e.g., $C_4$ and lower, undesirable high carbon number hydrocarbons, e.g., $C_{10}$ and higher, and aromatic hydrocarbons. The process provides higher yields of useful, high octane hydrocarbons boiling in the gasoline range.

15 Claims, 2 Drawing Sheets

Syngas Conversion on $2ZnO\text{-}Cr_2O_3$ + ZSM-5
350°C, 40 atm, $H_2/CO$ = 2, TOS = 450h, GHSV = 3200$h^{-1}$ Syngas Conversion on $2ZnO-Cr_2O_3$ + GaZSM-5
350°C, 40 atm, $H_2/CO$ = 2, TOS = 450h, GHSV = 3200h$^{-1}$

US 7,943,673 B2

PROCESS FOR CONVERSION OF SYNTHESIS GAS TO HYDROCARBONS USING A ZEOLITE-METHANOL CATALYST SYSTEM

BACKGROUND OF THE INVENTION

The invention relates to a process for converting synthesis gas comprising hydrogen and carbon monoxide to hydrocarbons using a zeolite-methanol catalyst system containing a methanol catalyst and a molecular sieve zeolite catalyst.

Processes are known in which a gaseous feedstock is converted to an intermediate product and the intermediate product is converted to a liquid hydrocarbon fuel product simultaneously through the use of catalyst systems comprising mixtures of catalysts. Zeolite-methanol catalyst systems have been used for producing hydrocarbons boiling in the gasoline range from synthesis gas, also referred to as syngas. Such catalyst systems contain a high-temperature methanol catalyst, such as $ZnO$—$Cr_2O_3$, capable of converting the syngas to methanol, and a molecular sieve zeolite catalyst, such as ZSM-5, capable of converting the methanol to hydrocarbons. U.S. Pat. Nos. 4,011,275 and 4,180,516 and 4,331,774 each disclose catalyst systems comprising such combinations in order to obtain highly aromatic hydrocarbon products.

Zeolite catalysts are well-known in the processing of petroleum and in the production of various petrochemicals. ZSM-5, disclosed and claimed in U.S. Pat. No. 3,702,886, is a widely used zeolite catalyst. ZSM-5 catalysts are generally characterized by tetrahedral frameworks primarily composed of $SiO_2$ with occasional aluminum substitutions. Because of their shape selectivity as molecular sieves and high degree of thermal stability, ZSM-5 catalysts are known for use in many hydrocarbon conversion reactions. It is advantageous at times to synthesize a catalyst so that its activity is directed to a specific hydrocarbon reaction. U.S. Pat. No. 4,968,650 discloses two methods for preparing ZSM-5 catalysts containing gallium primarily present in the framework of the catalyst and the use of such catalysts to produce high octane aromatics. The catalyst is disclosed for use in cracking and light paraffin upgrading, particularly converting $C_2$-$C_{12}$ paraffins, olefins and naphthenes to high octane aromatics.

Known processes for converting syngas to liquid hydrocarbons via methanol as an intermediate result in a broad distribution of hydrocarbons containing significant amounts of undesirable low carbon number hydrocarbons, e.g., $C_4$ and lower and undesirable high carbon number hydrocarbons, e.g., $C_{10}$ and higher. Production of such low carbon number hydrocarbons is highly inefficient as these hydrocarbons are not useful in gasoline products. Such high carbon number hydrocarbons require further processing such as cracking to form suitable hydrocarbons for use in gasoline. It would be desirable to have an improved process for conversion of syngas to liquid hydrocarbons via methanol with a minimum of processing resulting in higher yields of useful, high octane hydrocarbons boiling in the gasoline range. In view of current focus on stricter environmental standards, it would further be desirable for the improved process to produce reduced levels of aromatics as compared with known processes.

SUMMARY OF THE INVENTION

According to one embodiment, the invention is directed to a process for converting synthesis gas feedstock comprising hydrogen and carbon monoxide at a molar ratio between about 1.5:1 and about 2.5:1 to predominately hydrocarbons boiling in the gasoline range, the process comprising:

contacting the synthesis gas feedstock with a catalyst system comprising GaZSM-5 catalyst and a methanol catalyst at a temperature between about 330° C. and about 370° C. and a pressure between about 20 atm and about 100 atm for a time sufficient to produce hydrocarbons;

wherein the hydrocarbons produced contain less than about 10% by volume aromatic hydrocarbons and at least about 75% by volume $C_5+$ liquid hydrocarbons.

According to another embodiment, the invention is directed to a catalyst system for converting synthesis gas comprising hydrogen and carbon monoxide at a molar ratio between about 1.5:1 and about 2.5:1 to predominately gasoline boiling range hydrocarbons, the catalyst system comprising a mixture of acidic GaZSM-5 catalyst and a methanol catalyst comprising $ZnO$—$Cr_2O_3$ having a Zn:Cr atomic ratio of between about 0.5 and about 2 and having a surface area of between about 100 $m^2/g$ and about 240 $m^2/g$, wherein the weight ratio of methanol catalyst to acidic GaZSM-5 catalyst is between about 10:90 and about 90:10.

DETAILED DESCRIPTION OF THE INVENTION

Figure 1:
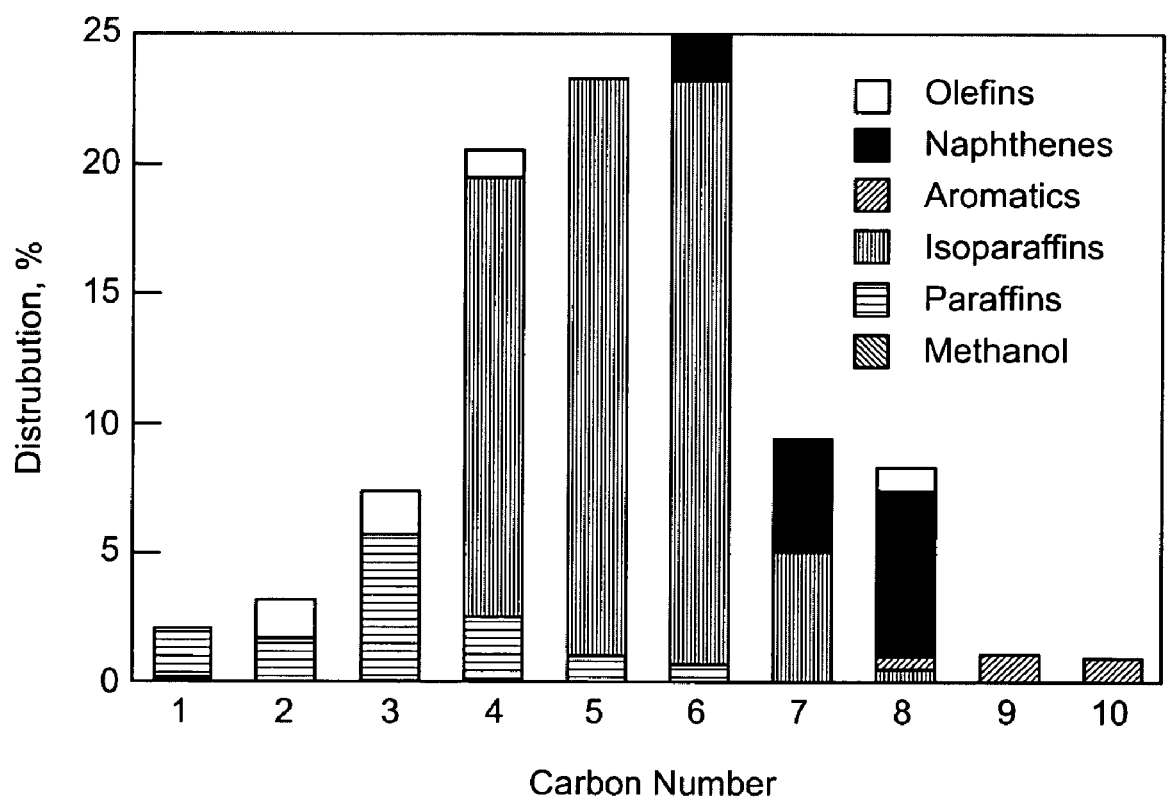
FIG. 1 is a graph of the percent by volume of hydrocarbon fractions produced by conversion of syngas using a catalyst system according to the prior art.

The process of the invention is useful for converting synthesis gas (also referred to as syngas) to hydrocarbons at intermediate temperatures and moderately high pressures using a catalyst system comprising a mixture of a methanol synthesis catalyst; comprising $ZnO$—$Cr_2O_3$ for converting syngas to methanol and a ZSM-5 catalyst synthesized with Ga in at least a portion of its lattice framework positions (also referred to as GaZSM-5) for converting the methanol to liquid hydrocarbon fuel. The catalyst system provides improved selectivities for hydrocarbons having boiling temperatures in the gasoline range when compared with a catalyst system comprising a mixture of standard ZSM-5 and $ZnO$—$Cr_2O_3$ catalysts at similar temperatures and pressures.

As defined herein, hydrocarbons boiling in the gasoline range include hydrocarbons having a T10 point or 10% recovered boiling point of between about 122° F. and about 158° F., a T90 point or 90% recovered boiling point of between about 365° F. and about 374° F., and an end point or final boiling point of about 437° F., as determined according to ASTM D86, Standard Test Method for Distillation of Petroleum Products at Atmospheric Pressure. Such hydrocarbons generally contain $C_5$-$C_9$ components, with a very small fraction of $C_{10}$.

The methanol catalyst for converting syngas to methanol is a $ZnO$—$Cr_2O_3$ catalyst having a Zn:Cr atomic ratio of between about 0.5:1 and about 2:1. The methanol catalyst advantageously has a BET (Brunauer, Emmett and Teller) surface area of between about 100 $m^2/g$ and about 240 $m^2/g$, even between about 180 $m^2/g$ and about 240 $m^2/g$. BET surface area is determined by volumetric nitrogen physisorption with automatic dosing at liquid nitrogen temperature analyzed by a commercial instrument according to the BET equation, using a multipoint analysis in the normalized pressure range $P/P_o$ of 0.05 to 0.20, wherein PO is the saturation nitrogen pressure, approximately equal to the barometric pressure.

The GaZSM-5 catalyst for converting methanol to gasoline is a crystalline gallium silicate zeolite in the acid form which functions as a molecular sieve. The ratio of Si/Ga is between about 10 and about 120, even between about 20 and about 80, as determined by Inductively Coupled Plasma Mass Spectrometry (ICP-MS). The as-made form of the GaZSM-5 catalyst contains gallium primarily in the zeolite lattice positions rather than in ion exchange positions or outside the lattice altogether. It is believed that gallium in the lattice position is more resistant to reduction.

The GaZSM-5 catalyst can be characterized by its X-ray diffraction pattern. The X-ray diffraction pattern lines of Table 1 are representative of as-synthesized GaZSM-5 made in accordance with this invention. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Y/W mole ratio from sample to sample. Calcination can also cause minor shifts in the X-ray diffraction pattern. Notwithstanding these minor perturbations, the basic crystal lattice structure remains unchanged. The X-ray diffraction pattern lines of Table 2 are representative of calcined GaZSM-5 made in accordance with this invention. The powder X-ray diffraction patterns presented herein were determined by standard techniques. The radiation was CuK-α radiation. The peak heights and the positions, as a function of 2θ where θ is the Bragg angle, were read from the relative intensities of the peaks (adjusting for background), and d, the interplanar spacing in Angstroms corresponding to the recorded lines, can be calculated. The X-ray patterns provided are based on the following relative intensity scale in which the strongest line in the X-ray pattern is assigned a value of 100:

60-100=VS (Very Strong)
40-60=S (Strong)
20-40=M (Medium)
10-20=MW (Medium-Weak)
<10=W (Weak)

TABLE 1

| 2 Theta (±0.20) | d-spacing (Angstroms) | Relative Integrated Intensity (%) |
|---|---|---|
| 7.92 | 11.16 | M |
| 8.81 | 10.03 | MW |
| 9.06 | 9.75 | W |
| 13.91 | 6.36 | W |
| 20.34 | 4.36 | W |
| 20.85 | 4.26 | W |
| 23.12 | 3.84 | VS |
| 23.94 | 3.71 | S |
| 24.38 | 3.65 | M |
| 25.89 | 3.44 | W |
| 29.23 | 3.05 | W |
| 29.91 | 2.98 | MW |

TABLE 2

| 2 Theta (±0.20) | d-spacing (Angstroms) | Relative Integrated Intensity (%) |
|---|---|---|
| 7.93 | 11.14 | VS |
| 8.82 | 10.01 | VS |
| 9.08 | 9.73 | MW |
| 14.79 | 5.98 | M |
| 15.91 | 5.57 | MW |
| 23.09 | 3.85 | VS |
| 23.29 | 3.82 | M |
| 23.73 | 3.75 | M |
| 23.93 | 3.72 | M |
| 24.42 | 3.64 | M |
| 26.63 | 3.34 | MW |
| 29.88 | 2.99 | MW |

The two catalysts of the catalyst system are combined within a reactor by any suitable known method to form the catalyst system. The catalysts can be arranged with respect to each other in a variety of ways. The catalysts can be coarsely or finely blended. The two catalysts can alternatively be arranged in alternating layers, in which case the syngas would initially be contacted by a methanol synthesis catalyst layer and finally be contacted by a zeolite catalyst layer. The catalyst particles can be in any known form, including finely divided powders, granules, tablets and extrudates. The catalyst particles are preferably one to several millimeters in diameter. The individual particles can be comprised entirely of one of the two catalysts, or the particles can be comprised of a mixture of the two catalysts. The weight ratio of ZnO—$Cr_2O_3$ to GaZSM-5 is between about 10:90 and about 90:10, even between about 40:60 and about 80:20.

Syngas feedstock containing, but not limited to, hydrogen and carbon monoxide is introduced to a reactor, e.g., a fixed bed reactor or a fluid bed reactor. The gas may be introduced in any suitable direction, e.g., upward or downward. The molar ratio of hydrogen to carbon monoxide is between about 1.5:1 and about 2.5:1. The gas is brought into contact with the catalyst system of the invention at a temperature between about 330° C. and about 370° C. and a pressure between about 20 atm and about 100 atm. The flow rate expressed as gas hourly space velocity (GHSV) is between about 2000/hour and about 4000/hour. As defined herein, GHSV is the volume of reactant mixture passed through a volume of catalyst per hour.

The conversion process of the invention results in hydrocarbons boiling in the gasoline range useful as fuel having an improved distribution of hydrocarbon components. The hydrocarbons produced contains greater than about 75% by volume $C_5+$ liquids, and advantageously between about 75% and about 85% by volume $C_5$-$C_9$ liquids. As used herein, a $C_n$ compound refers to a hydrocarbon with n carbon atoms per molecule. For instance, $C_5$-$C_9$ refers to hydrocarbons with 5 to 9 carbon atoms per molecule, and $C_5+$ refers to hydrocarbons having 5 or more carbon atoms per molecule. The $C_5+$ hydrocarbon component produced by the process of the invention, specifically in the $C_5$-$C_9$ range, has a high octane content, mainly comprising isoparaffins and cycloparaffins and containing less than about 10% by volume aromatic hydrocarbons, therefore the hydrocarbons produced are relatively benign in terms of environmental effects and is acceptable according to current standards. The hydrocarbons produced contain low levels of undesirable hydrocarbon components, e.g., between about 3% and about 5% by volume $C_1$-$C_2$ hydrocarbons, between about 18% and about 20% $C_3$-$C_4$ hydrocarbons, and less than about 2% $C_{10}+$ hydrocarbons. The hydrocarbons produced advantageously contain less than about 10% paraffins, greater than about 5% olefins and/or greater than about 15% naphthenes.

The percentages of various carbon components were determined by analyzing the resulting product by gas chromatography on a multicolumn, multidetector chromatograph available from Agilent Technologies (Santa Clara, Calif.) having a flame ionization detector for quantitative analysis of hydrocarbons, methanol, and DME; a thermal conductivity detector for quantitative analysis of $H_2$, CO and $CO_2$; and a mass spectrometry detector for qualitative identification of various hydrocarbon components. Overall rates were checked by analysis of inlet and outlet CO, $CO_2$, $CH_4$, $H_2$, and total hydrocarbon flows using separate continuous analyzers for each of these components. The analyzers are available from ABB Ltd., Zurich, Switzerland.

The $C_5$-$C_9$ hydrocarbons produced according to the invention can be further subject to distillation to provide liquid fuel such as gasoline.

EXAMPLES

Preparation of Sample A of GaZSM-5

The following procedure was followed to synthesize Sample A of GaZSM-5 used in the examples of the catalyst system of the invention. 20.15 g of 40% tetrapropylammonium hydroxide aqueous solution was mixed with 216.5 g of deionized water in a Teflon® insert cup for a 1-liter Parr steel autoclave. Next 4.0 g of sodium hydroxide pellets was dissolved in the solution. 2.35 g of gallium oxide powder was then dissolved in the hydroxide solution. 45.0 g of Cabosil M-5 fumed silica (available from Eager Polymers) was then mixed into the solution by hand to create a uniform gel. The insert cup was then sealed inside the Parr autoclave equipped within an overhead stirrer. The autoclave was then placed inside a furnace and heated to 175° C. over an 8-hour period. The temperature was then held at 175° C. for 6 days. During the synthesis, the gel was mixed with the overhead stirrer at 150 rpm. The autoclave was then allowed to cool to ambient temperature and the resultant solid product was isolated by filtering the suspension through a fritted funnel. The product was washed with at least 2 liters of deionized water.

The product from the above synthesis was next calcined by heating the zeolite in a muffle furnace in a nitrogen stream with a slight bleed of air at a rate of about 20 standard-cubic feet per minute. The zeolite was heated to 120° C. at 1° C./min, allowed to remain at 120° C. for 2 hours, heated to 595° C. at 1° C./min, and allowed to remain at 595° C. for 5 hours. The zeolite was then allowed to cool to ambient temperature.

The calcined zeolite was then exchanged into the ammonium form. An amount of ammonium nitrate equal to the mass of the zeolite to be exchanged was fully dissolved in an amount of deionized water ten times the mass of the zeolite. The zeolite was then added to the solution and the suspension was sealed in a polypropylene bottle and heated in an oven at 95° C. overnight. The bottle was then removed from the oven, and the zeolite was recovered by filtration. The zeolite was washed with an amount of deionized water that is at least ten times the amount of deionized water used in the ammonium exchange solution. A second exchange was then repeated on the same zeolite as described above. After the second exchange, the zeolite was allowed to dry in an oven at 95° C. overnight.

The ammonium-exchanged zeolite was converted to the acid form by calcining the zeolite in air. The zeolite was heated to 120° C. at 1° C./min, allowed to remain at 120° C. for 2 hours, heated to 495° C. at 1° C./min, and allowed to remain at 495° C. for 5 hours. The zeolite was then allowed to cool to ambient temperature.

Powder x-ray diffraction pattern indicated the material to be ZSM-5 with no detectable levels of other crystalline or amorphous phases. The Si/Ga molar ratio of the zeolite was measured to be 26.8 by Inductively Coupled Plasma mass spectrometry (ICP-MS).

Preparation of Sample B of GaZSM-5

The following procedure was followed to synthesize Sample B of GaZSM-5 used in the examples of the catalyst system of the invention. 65.7 g of 40% tetrapropylammonium hydroxide aqueous solution was mixed with 336.6 g of deionized water in a Teflon® insert cup for a 1-liter Parr steel autoclave. Next 2.7 g of sodium hydroxide pellets was dissolved in the solution. 130.5 g of a colloidal suspension of gallia-coated silica (31% solids, Si/Ga=40, TX11678, Lot 5453-160, provided by Nalco Company) was then mixed with the solution to create a uniform suspension. The insert cup was then sealed inside the Parr autoclave equipped within an overhead stirrer. The autoclave was then placed inside a furnace and heated to 160° C. over an 8-hour period. The temperature was then held at 160° C. for 44 hours. During the synthesis, the suspension was mixed with the overhead stirrer at 150 rpm to form a gel. The autoclave was then allowed to cool to ambient temperature and the resultant solid product was isolated by filtering the suspension through a fritted funnel. The product was washed with at least 2 liters of deionized water.

The zeolite was converted into the acid form using the above described procedure for preparing Sample A. Powder x-ray diffraction pattern indicated the material to be ZSM-5 with no detectable levels of other crystalline or amorphous phases. The Si/Ga molar ratio of the zeolite was measured to be 40.0 by ICP-MS.

Table 3 and Table 4 include x-ray diffraction pattern data for the GaZSM-5 of Sample B and calcined GaZSM-5 of Sample B, respectively.

TABLE 3

| 2 Theta (±0.20) | d-spacing (Angstroms) | Relative Integrated Intensity (%) |
|---|---|---|
| 7.92 | 11.16 | 26 |
| 8.81 | 10.03 | 16 |
| 9.06 | 9.75 | 7 |
| 9.83 | 8.99 | 1 |
| 11.87 | 7.45 | 6 |
| 12.49 | 7.08 | 3 |
| 13.24 | 6.68 | 2 |
| 13.91 | 6.36 | 7 |
| 14.62 | 6.06 | 3 |
| 14.74 | 6.01 | 5 |
| 15.50 | 5.71 | 4 |
| 15.88 | 5.58 | 4 |
| 15.96 | 5.55 | 2 |
| 16.50 | 5.37 | 1 |
| 17.19 | 5.15 | 1 |
| 17.73 | 5.00 | 3 |
| 19.24 | 4.61 | 5 |
| 19.92 | 4.45 | 1 |
| 20.34 | 4.36 | 7 |
| 20.85 | 4.26 | 7 |
| 21.76 | 4.08 | 1 |
| 22.14 | 4.01 | 4 |
| 23.12 | 3.84 | 100 |
| 23.65 | 3.76 | 5 |
| 23.94 | 3.71 | 45 |
| 24.38 | 3.65 | 22 |
| 25.89 | 3.44 | 9 |
| 26.70 | 3.34 | 6 |

TABLE 3-continued

| 2 Theta (±0.20) | d-spacing (Angstroms) | Relative Integrated Intensity (%) |
|---|---|---|
| 26.91 | 3.31 | 6 |
| 27.33 | 3.26 | 3 |
| 29.23 | 3.05 | 7 |
| 29.91 | 2.98 | 10 |
| 30.28 | 2.95 | 3 |

TABLE 4

| 2 Theta (±0.20) | d-spacing (Angstroms) | Relative Integrated Intensity (%) |
|---|---|---|
| 7.93 | 11.14 | 100 |
| 8.82 | 10.01 | 71 |
| 9.08 | 9.73 | 10 |
| 9.88 | 8.94 | 1 |
| 11.88 | 7.45 | 1 |
| 11.93 | 7.41 | 1 |
| 12.48 | 7.09 | 0 |
| 13.21 | 6.70 | 6 |
| 13.93 | 6.35 | 14 |
| 14.79 | 5.98 | 24 |
| 15.53 | 5.70 | 10 |
| 15.91 | 5.57 | 17 |
| 16.54 | 5.36 | 3 |
| 17.31 | 5.12 | 1 |
| 17.68 | 5.01 | 5 |
| 17.84 | 4.97 | 6 |
| 19.23 | 4.61 | 5 |
| 20.36 | 4.36 | 8 |
| 20.86 | 4.25 | 10 |
| 21.82 | 4.07 | 1 |
| 22.21 | 4.00 | 3 |
| 23.09 | 3.85 | 91 |
| 23.29 | 3.82 | 34 |
| 23.73 | 3.75 | 31 |
| 23.93 | 3.72 | 25 |
| 24.42 | 3.64 | 37 |
| 25.59 | 3.48 | 5 |
| 25.89 | 3.44 | 7 |
| 26.27 | 3.39 | 1 |
| 26.63 | 3.34 | 13 |
| 26.97 | 3.30 | 7 |
| 27.44 | 3.25 | 3 |
| 28.00 | 3.18 | 2 |
| 28.46 | 3.13 | 2 |
| 29.29 | 3.05 | 9 |
| 29.88 | 2.99 | 15 |
| 30.35 | 2.94 | 9 |

Preparation of Sample of Methanol Catalyst

The following procedure was followed to synthesize the sample of methanol catalyst used in the examples of the catalyst system of the invention. An aqueous solution of zinc nitrate plus chromium (III) nitrate was heated to 70° C. and precipitated in a turbulent mixer with an aqueous, 2 molar solution of potassium carbonate, also at 70° C. The zinc-chromium catalyst had a Zn/Cr ratio of 1. Flow rates of the nitrate and carbonate solutions were adjusted to give a pH of 7 in the mixing region. The slurried precipitate was collected in a heated container and maintained at 70° C. for one hour. The precipitate was filtered with a Buchner funnel and washed with 70° C. water while still on the funnel, until the conductivity of the wash water fell below 100 µS. The washed precipitate was then dried for 16 hours in an oven at 80° C.

The dried filter cake was broken up and sieved to less than 500 µm particle size. In this granular form, the dried 2ZnO—$Cr_2O_3$ material was calcined in 10 g batches in shallow, 2 mm thick beds, by heating in a vacuum oven in a controlled atmosphere of forming gas containing 5 vol % hydrogen and 95 vol % nitrogen. The oven was heated at 1° C./min. to 250° C. and held at that temperature for 3 hours, then cooled. The resulting catalyst had a BET surface area of about 218 $m^2/g$.

Preparation of Examples of Catalyst System of the Invention

The following procedure was followed to form examples of the catalyst system of the invention. The ZnO—$Cr_2O_3$ methanol catalyst prepared as described above was ground and sieved to 125-160 µm. A cylindrical reactor with 4.5 mm internal diameter was packed with a physical mixture of 0.536 g of 125-160 µm 2ZnO—$Cr_2O_3$ and 0.326 g of 125-160 µm GaZSM-5 (each of Sample A and Sample B described above). These weights gave approximately equal volumes of the two components. The total volume of the mixed catalyst bed was 1.185 mL. Layers of 125-160 µm corundum were placed above and below the catalyst bed, and layers of 125-160 µm steatite were placed above and below the corundum.

The catalyst system was activated in situ in test reactors. Approximately one gram samples, 1.2-1.4 mL in volume, were loaded in reactors with diameters of 4.5 or 5.0 mm. The catalyst bed heights were 7-11 cm. The catalysts were reduced in pure hydrogen flowing at 100 mL/min. per reactor (GHSV of 4000-5000/hour). The pressure was increased to 40 atm, and then the catalysts were heated at about 10° C. to 200° C. A linear temperature ramp of 1° C./min. was then followed up to 350° C. and the temperature was held for 10 hours.

After activation, with the catalysts still at 350° C., 40 atm, in a 100 mL/min flow of hydrogen, a carbon monoxide flow was introduced stepwise while the hydrogen flow was decreased until the $H_2$/CO inlet ratio was 2 and the flow rate was 67 mL/min (GHSV of 3000/hour) per reactor. Conditions were held constant for several hundred hours and the products were analyzed both continuously on stream with ABB sensors detecting for $H_2$, CO, $CO_2$, $CH_4$, and total hydrocarbons, and periodically on stream by gas chromatography for hydrocarbons between $C_1$ and $C_{12}$. The resulting hydrocarbons, as indicated in the Table below, included approximately 5% $C_1+C_2$ hydrocarbons, 19% $C_3+C_4$ hydrocarbons and 75-76% $C_5+$ liquid hydrocarbons. Most of the improvement in liquids yield was in cycloparaffins production.

Comparative Example

Syngas having a ratio of $H_2$ to CO of 2 was fed to a catalyst mixture at a temperature of 350° C., a pressure of 40 atm, and a GHSV of 3000/hour. The catalyst mixture had a 50:50 volume ratio of standard ZSM-5 catalyst in its acid form (CBV 8014 obtained from Zeosit) to ZnO—$Cr_2O_3$ catalyst having a Zn/Cr atomic ratio of 1. The resulting hydrocarbons included 5% $C_1+C_2$ hydrocarbons, 25-26% C3+C4 hydrocarbons (mainly isobutane), and 69-70% $C_5+$ hydrocarbons (mainly isoparaffins and cycloparaffins) after 800 hours on stream.

Figure 2:
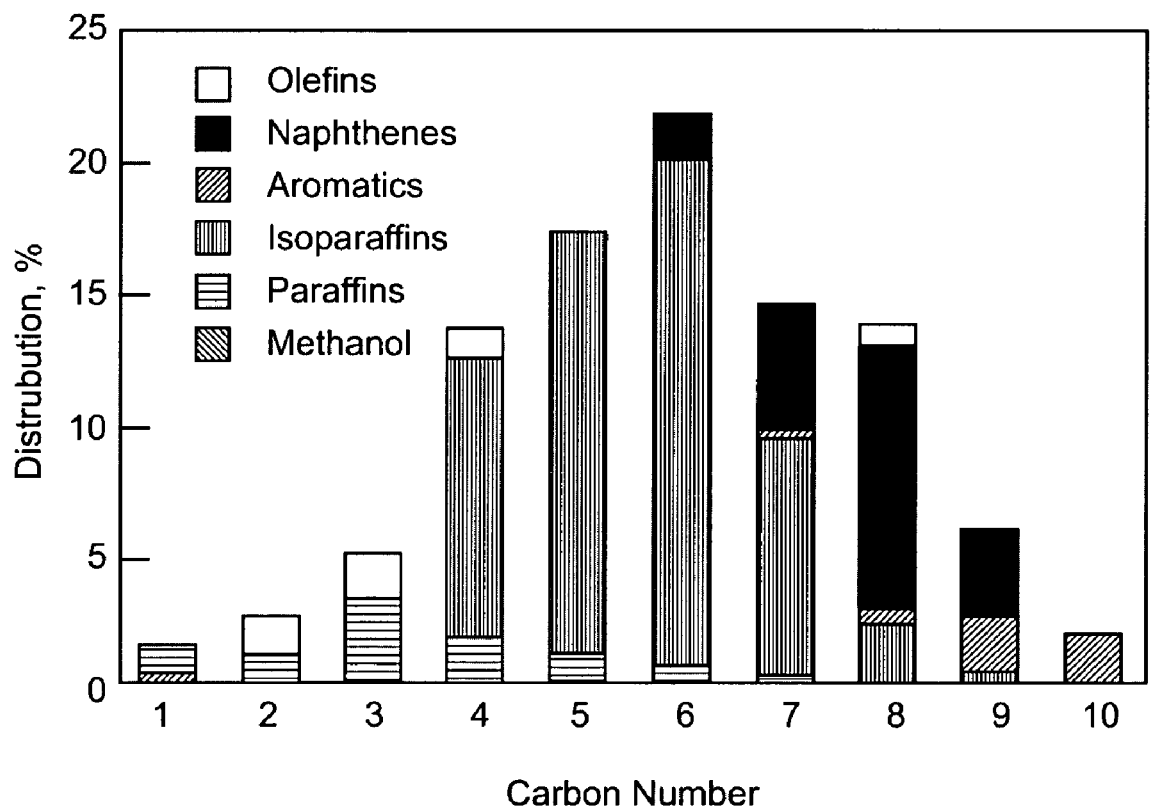
FIG. 2 is a graph of the percent by volume of hydrocarbon fractions produced by conversion of syngas using a catalyst system according to the invention.

As can be seen in Table 5 and by comparing FIGS. 1 and 2, the process of converting syngas using a catalyst system comprising ZnO—$Cr_2O_3$ methanol catalyst and GaZSM-5 yields an improved gasoline composition relative to the process utilizing standard ZSM-5. The gasoline composition made according to the invention includes reduced levels of undesirable $C_1$-$C_4$ components, increased levels of desirable high-octane $C_5+$ components and reduced levels of undesirable high carbon number hydrocarbons and aromatics.

The synthesis rates in Table 5 refer, respectively, to the weight of C in the hydrocarbon products synthesized per hour per weight of zinc-chromium methanol catalyst, and to the weight of carbon in the hydrocarbon products formed per hour per total volume of catalyst.

TABLE 5

| | Zeolite | | |
| --- | --- | --- | --- |
| | ZSM-5 | GaZSM-5 Sample A | GaZSM-5 Sample B |
| Selectivities (fraction of CO to product): | | | |
| Methanol | 0.2% | 0.4% | 0.4% |
| DME | 0.0% | 0.0% | 0.0% |
| $CH_4$ | 1.9% | 1.2% | 1.1% |
| $C_2$'s | 2.6% | 2.9% | 2.6% |
| $C_3$'s | 6.4% | 5.1% | 5.0% |
| $C_4$'s | 20.2% | 14.0% | 14.0% |
| $C_5$+ Liquids | 68.6% | 76.5% | 77.0% |
| Selectivities by product type: | | | |
| Oxygenates | 0.2% | 0.4% | 0.4% |
| Paraffins | 14.0% | 9.7% | 9.2% |
| Isoparaffins | 67.9% | 56.4% | 58.6% |
| Aromatics | 2.6% | 6.3% | 5.1% |
| Naphthenes | 12.8% | 21.4% | 21.3% |
| Olefins | 2.5% | 6.0% | 5.5% |
| Synthesis rates: | | | |
| $g_C/h/g_{ZnCr}$ | 0.29 | 0.29 | 0.29 |
| $g_C/h/ml_{catalyst}$ | 0.13 | 0.13 | 0.13 |

What is claimed is:

1. A process for converting synthesis gas feedstock comprising hydrogen and carbon monoxide at a molar ratio between about 1.5:1 and about 2.5:1 to predominately hydrocarbons boiling in the gasoline range, the process comprising:
contacting the synthesis gas feedstock with a catalyst system comprising GaZSM-5 catalyst and a methanol catalyst at a temperature between about 330° C. and about 370° C. and a pressure between about 20 atm and about 100 atm for a time sufficient to produce hydrocarbons; wherein the hydrocarbons produced contain less than about 10% by volume aromatic hydrocarbons and at least about 75% by volume $C_5$+ liquid hydrocarbons.

2. The process of claim 1 wherein the methanol catalyst is $ZnO$—$Cr_2O_3$ having a surface area of between about 100 $m^2/g$ and about 240 $m^2/g$.

3. The process of claim 1 wherein the methanol catalyst is $ZnO$—$Cr_2O_3$ having a surface area of between about 180 $m^2/g$ and about 240 $m^2/g$.

4. The process of claim 2 wherein the methanol catalyst has a Zn:Cr atomic ratio of between about 0.5 and about 1.

5. The process of claim 1 wherein the weight ratio of methanol catalyst to GaZSM-5 catalyst is between about 10:90 and about 90:10.

6. The process of claim 1 wherein the weight ratio of methanol catalyst to GaZSM-5 catalyst is between about 40:60 and about 80:20.

7. The process of claim 1 wherein the GaZSM-5 catalyst has a Si/Ga ratio of between about 10 and about 120.

8. The process of claim 1 wherein the GaZSM-5 catalyst has a Si/Ga ratio of between about 20 and about 80.

9. The process of claim 1 having a gas hourly space velocity of between about 2000/hour and about 4000/hour.

10. The process of claim 1 wherein the hydrocarbons produced contain between about 3% and about 5% by volume $C_1$-$C_2$ hydrocarbons and between about 18% and about 20% by volume $C_3$-$C_4$ hydrocarbons.

11. The process of claim 1 wherein the hydrocarbons produced contain between about 75% and about 85% by volume $C_5$-$C_9$ liquid hydrocarbons.

12. The process of claim 1 wherein the hydrocarbons produced contain less than about 10% paraffins.

13. The process of claim 1 wherein the hydrocarbons produced contain greater than about 5% olefins.

14. The process of claim 1 wherein the hydrocarbons produced contain greater than about 15% naphthenes.

15. The process of claim 1 wherein the hydrocarbons produced contain less than about 10% paraffins, greater than about 5% olefins and greater than about 15% naphthenes.

* * * * *